(12) United States Patent
Imoto et al.

(10) Patent No.: US 11,831,194 B2
(45) Date of Patent: Nov. 28, 2023

(54) CHARGER THAT ENABLES ABSORPTION OF POWER PULSES

(71) Applicant: Yazaki Corporation, Tokyo (JP)

(72) Inventors: Kentaro Imoto, Susono (JP); Akinori Maruyama, Susono (JP); Keisuke Ueta, Susono (JP); Yoshiya Ohnuma, Nagaoka (JP); Shohei Komeda, Tokyo (JP)

(73) Assignee: YAZAKI CORPORATION, Tokyo (JP)

( * ) Notice: Subject to any disclaimer, the term of this patent is extended or adjusted under 35 U.S.C. 154(b) by 374 days.

(21) Appl. No.: 17/392,343

(22) Filed: Aug. 3, 2021

(65) Prior Publication Data

US 2022/0060045 A1    Feb. 24, 2022

(30) Foreign Application Priority Data

Aug. 19, 2020  (JP) .................... 2020-138698

(51) Int. Cl.
*H02J 7/06* (2006.01)
*H02J 7/00* (2006.01)
(Continued)

(52) U.S. Cl.
CPC .............. *H02J 7/06* (2013.01); *H02J 7/00711* (2020.01); *H02M 3/33573* (2021.05);
(Continued)

(58) Field of Classification Search
CPC .... H02M 1/00; H02M 1/0045; H02M 1/4233; H02M 3/33573; H02M 3/33576;
(Continued)

(56) References Cited

U.S. PATENT DOCUMENTS

| | | | | |
|---|---|---|---|---|
| 10,116,233 | B2 * | 10/2018 | Chen ................... | H02M 1/0085 |
| 10,944,283 | B2 * | 3/2021 | Tseng ................... | H02M 7/217 |
| 2014/0192562 | A1 * | 7/2014 | Cho ..................... | H02M 1/4258 |
| | | | | 363/21.12 |

OTHER PUBLICATIONS

Murat Yilmaz et al., "Review of Battery Charger Topologies, Charging Power Levels, and Infrastructure for Plug-In Electric and Hybrid Vehicles", IEEE Transactions on Power Electronics, May 2012, pp. 2151-2169, vol. 28, No. 5.
(Continued)

*Primary Examiner* — Richard Isla
*Assistant Examiner* — Sadia Kousar
(74) *Attorney, Agent, or Firm* — Sughrue Mion, PLLC

(57) ABSTRACT

A charger includes a rectifier including two input terminals for connection to an AC power supply, a cathode terminal and an anode terminal, a DC/DC converter including a first terminal be connected to the cathode terminal, a second terminal to be connected to the anode terminal, and two output terminals for connection to a battery, a power pulsation absorbing circuit including a first diode, a second diode, a third diode, an inductor, a capacitor, a first switch and a second switch, and a control section configured to control a switch of the DC/DC converter, the first switch and the second switch, wherein the control section is configured to control the DC/DC converter, the first switch and the second switch in such a way that a sum of a power outputted from the AC power supply and a power outputted from the capacitor is constant.

9 Claims, 9 Drawing Sheets

(51) Int. Cl.
*H02M 3/335* (2006.01)
*H02M 7/06* (2006.01)

(52) U.S. Cl.
CPC ..... *H02M 3/33576* (2013.01); *H02J 2207/20* (2020.01); *H02M 7/06* (2013.01)

(58) Field of Classification Search
CPC .... H02M 7/06; H02J 2207/20; H02J 2207/50; H02J 7/00711; H02J 7/06; H02J 7/345
See application file for complete search history.

(56) References Cited

OTHER PUBLICATIONS

Juncheng Lu et al., "An Indirect Matrix Converter based 97%-efficiency On-board Level 2 Battery Charger Using E-mode GaN HEMTs", 2015 IEEE 3rd Workshop on Wide Bandgap Power Devices and Applications (WiPDA), Blacksburg, VA, 2015, pp. 351-358.

F. Jauch et al., "Single-Phase Single-Stage Bidirectional Isolated ZVS AC-DC Converter with PFC", 2012 15th International Power Electron. and Motion Control Conf. (EPE/PEMC), Novi Sad, 2012, pp. LS5d.1-1-LS5d.1-8.

* cited by examiner

CHARGER THAT ENABLES ABSORPTION OF POWER PULSES

BACKGROUND OF THE INVENTION

Technical Field

The present invention relates to a charger.

Background Art

In order to reduce carbon dioxide emission which is considered as a greenhouse gas, electric vehicles (EV) and plug-in hybrid electric vehicle (PHEV) are increasingly distributed widely. These vehicles are equipped with a charger which enables a battery to be charged via a household AC power supply.

For example, Non-Patent Documents 1 and 2 disclose a charger with a rectifier and an insulated DC/DC converter. A charger according to Non-Patent Document 1 includes a power factor correction (PFC) circuit with a capacitor with a large capacitance between the rectifier and the DC/DC converter in order to absorb pulsations in power of the AC power supply. On the other hand, a charger according to Non-Patent Document 2 includes only a capacitor with a small capacitance between the rectifier and the DC/DC converter, wherein such a capacitor cannot absorb pulsations in power of the AC power supply, so that the pulsated power is transferred to the battery.

Further, Non-Patent Document 3 discloses a charger with only an insulated AC/DC converter and without a rectifier. In the charger according to Non-Patent Document 3, a pulsated power is transferred to the battery.

CITATION LIST

Non-Patent Literature

Non-Patent Document 1: M. Yilmaz, P. T. Krein, "Review of Battery Charger Topologies, Charging Power Levels, and Infrastructure for Plug-In Electric and Hybrid Vehicles", IEEE Trans. on PELS, Vol. 28, No. 5 (2013)

Non-Patent Document 2: J. Lu, Q. Tian, K. Bai, A. Brown and M. McAmmond, "An indirect matrix converter based 97%-efficiency on-board level 2 battery charger using E-mode GaN HEMTs," 2015 IEEE 3rd Workshop on Wide Bandgap Power Devices and Applications (WiPDA), Blacksburg, V A, 2015, pp. 351-358.

Non-Patent Document 3: F. Jauch and J. Biela, "Single-phase single-stage bidirectional isolated ZVS AC-DC converter with PFC," 2012 15th International Power Electron. and Motion Control Conf. (EPE/PEMC), Novi Sad, 2012, pp. LS5d.1-1-LS5d.1-8.

SUMMARY OF THE INVENTION

For chargers to be installed in an automobile, there is demand for miniaturization. In order to achieve a miniaturized charger, it is necessary to miniaturize passive elements such as a capacitor, inductor and a transformer.

However, the charger according to Non-Patent Document 1 includes a PFC having a capacitor with a large capacitance in order to absorb pulsations in power of the AC power supply. The miniaturization of an inductor for the PFC and a transformer for a DC/DC converter can be achieved by a high-frequency operation. However, a capacitor for the PFC requires a capacitance which is sufficient to absorb pulsations in power of the AC power supply, whereby the miniaturization is difficult.

Further, in the charger according to Non-Patent Document 2, power with pulsation is inputted into the DC/DC converter. Therefore, the transformer for the DC/DC converter needs to take this pulsation into account, whereby the miniaturization is difficult.

Furthermore, the charger according to Non-Patent Document 3, power with pulsation is inputted into the AC/DC converter. Therefore, the transformer for the AC/DC converter needs to take this pulsation into account, whereby the miniaturization is difficult.

Thus, an objective of the present invention is to provide a small charger which enables pulsations in power to be absorbed.

In order to achieve the objective as described above, a charger according to the present invention includes: a rectifier including two input terminals, a cathode terminal and an anode terminal, wherein the two input terminals are provided for connection to an AC power supply; a DC/DC converter including: a first terminal configured to be connected to the cathode terminal of the rectifier via a first line; a second terminal configured to be connected to the anode terminal of the rectifier via a second line; and two output terminals for connection to a battery; a power pulsation absorbing circuit including a first diode, a second diode, a third diode, an inductor, a capacitor, a first switch and a second switch; and a control section configured to control a switch of the DC/DC converter, the first switch and the second switch, wherein the first diode is connected between the inductor and one of the two input terminals of the rectifier, and the second diode is connected between the inductor and another of the two input terminals of the rectifier, wherein the capacitor and the first switch are connected in series between the first line and the second line, and the capacitor is arranged on a side of the second line, wherein the third diode is connected between the inductor and a line connecting the capacitor to the first switch, wherein the second switch is connected between the second line and a line connecting the inductor to the third diode; and wherein the control section is configured to control the DC/DC converter, the first switch and the second switch in such a way that a sum of a power outputted from the AC power supply and a power outputted from the capacitor is constant.

The control section may be configured to control the DC/DC converter, the first switch and the second switch in such a way that a voltage applied to the capacitor is larger than an output voltage of the rectifier.

The control section may be configured to control the DC/DC converter, the first switch and the second switch so as to charge the capacitor with a portion of the power outputted from the AC power supply during a charging period, wherein during the charging period, an instantaneous power outputted from the AC power supply is higher than an average power of the power outputted from the AC power supply, wherein the control section may be further configured to control the DC/DC converter, the first switch and the second switch so as to discharge the power in the capacitor during a discharge period, wherein during the discharging period, the instantaneous power outputted from the AC power supply is lower than the average power of the power outputted from the AC power supply.

The control section may be configured to keep the second switch in an off-state during the discharging period.

The control section may be configured to control the DC/DC converter and the first switch in such a way that a high-frequency current of a leakage inductor of a transformer of the DC/DC converter has an asymmetric waveform.

With the present invention, it is possible to provide a small charger which enables power pulsations to be absorbed.

DETAILED DESCRIPTION OF THE PREFERRED EMBODIMENTS

<Charger 100>

Figure 1:
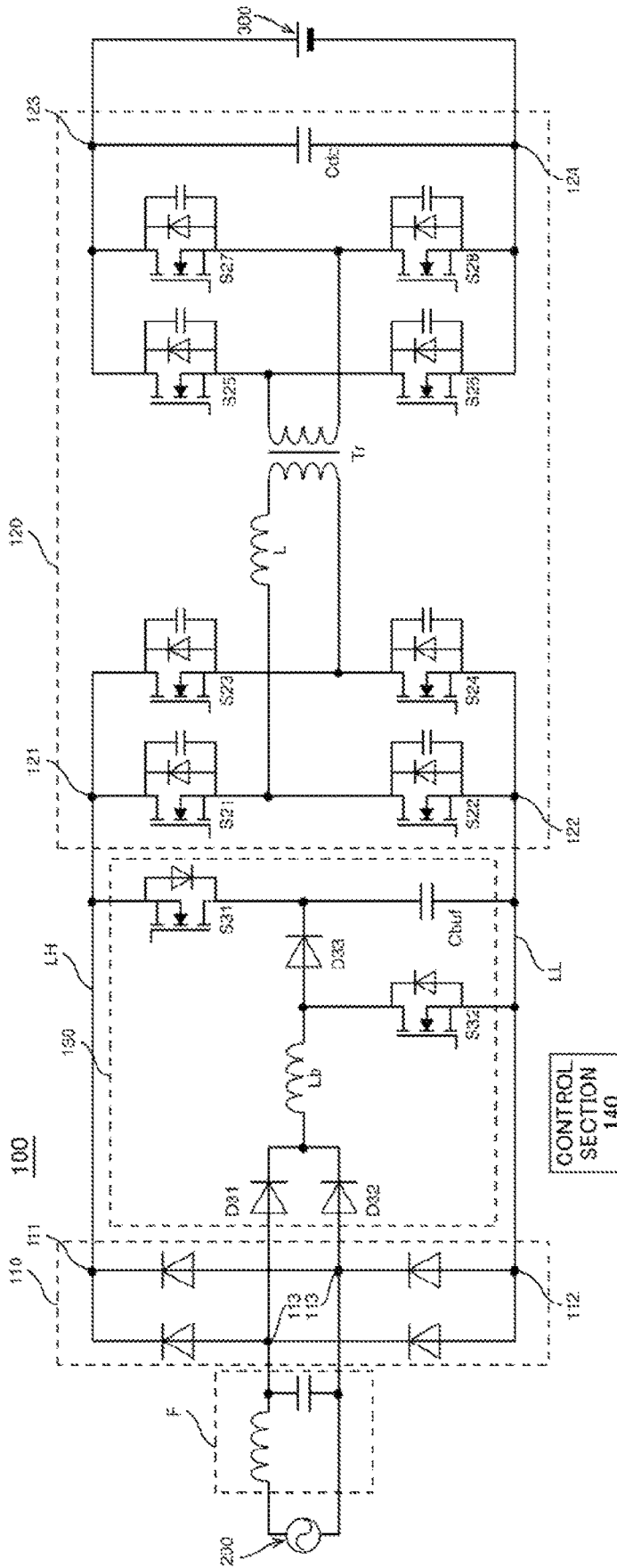
FIG. 1 shows a charger 100 according to an embodiment of the present invention.

FIG. 1 shows a charger 100 according to an embodiment of the present invention. The charger 100 includes a rectifier 110, a DC/DC converter 120, a power pulsation absorbing circuit 130, and control section 140. The DC/DC converter 120 is e.g. a DAB (Dual Active Bridge) converter 120, as shown in FIG. 1.

The rectifier 110 includes a cathode terminal 111, an anode terminal 112 and two input terminals 113 for connection to an AC power supply 200, wherein the cathode terminal 111 and the anode terminal 112 are connected to the DC/DC converter 120. For example, the rectifier 110 is a bridge diode rectifier as shown in FIG. 1, the bridge diode rectifier being formed by four diodes, wherein the rectifier 110 receives an AC current as an input between the two input terminals 113 connected to the AC power supply 200, converts the AC current into a DC current, and outputs it from the cathode terminal 111. The rectifier 110 may be connected to the AC power supply 200 via a filter F including an inductor and a capacitor, as shown in FIG. 1.

The DC/DC converter 120 includes a first terminal 121 connected to the cathode terminal 111 of the rectifier 110, a second terminal 122 connected to the anode terminal 112 of the rectifier 110, a third terminal 123 for connection to a positive electrode of a battery 300, and a fourth terminal 124 for connection to a negative electrode of the battery 300. The DC/DC converter 120 includes a transformer Tr, wherein the DC/DC converter 120 further includes four switches on an input side (primary side) with respect to the transformer Tr, i.e. a first switch S21, a second switch S22, a third switch S23 and a fourth switch S24, and four switches on an output side (secondary side) with respect to the transformer Tr, i.e. a fifth switch S25, a sixth switch S26, a seventh switch S27 and a eighth switch S28. For example, each of the eight switches S21 to S28 is an N-channel power MOSFET (Metal-Oxide-Semiconductor Field-Effect Transistor) with a reverse polarity diode (body diode). In this case, the N-channel power MOSFET may include a snubber capacitor, as shown in FIG. 1.

The DC/DC converter 120 includes an inductor L on the primary side of the transformer Tr. For example, this inductor L is a leakage inductor of the transformer Tr.

Further, a DC capacitor Cdc is connected between the third terminal 123 and the fourth terminal 124 of the DC/DC converter 120. In the charger 100 according to the present embodiment, a voltage $V_{dc}$ applied to the DC capacitor Cdc is outputted to the battery 300.

The power pulsation absorbing circuit 130 includes a first diode D31, a second diode D32, a third diode D33, an inductor Lb, a buffer capacitor Cbuf, a first switch S31, and a second switch S32.

The first diode D31 of the power pulsation absorbing circuit 130 is connected between the inductor Lb of the power pulsation absorbing circuit 130 and one of the two input terminals 113 of the rectifier 110, wherein the second diode D32 of the power pulsation absorbing circuit 130 is connected between the inductor Lb of the power pulsation absorbing circuit 130 and another of the two input terminals 113 of the rectifier 110. In this case, each of the first diode D31 and the second diode D32 of the power pulsation absorbing circuit 130 is connected between the inductor Lb of the power pulsation absorbing circuit 130 and the input terminals 113 of the rectifier 110 so that each of the first diode D31 and the second diode D32 has a forward direction from the input terminals 113 of the rectifier 110 to the inductor Lb. This results in that a DC current is inputted to the inductor Lb of the power pulsation absorbing circuit 130, even if the AC power supply 200 is connected to the input terminals 113 of the rectifier 110.

The buffer capacitor Cbuf and the first switch S31 of the power pulsation absorbing circuit 130 are connected in series between a first line LH and a second line LL, wherein the first line LH connects the cathode terminal 111 of the rectifier 110 to the first terminal 121 of the DC/DC converter 120, and the second line LL connects the anode terminal 112 of the rectifier 110 to the second terminal 122 of the DC/DC converter 120. The buffer capacitor Cbuf is arranged on the second line LL side, while the first switch S31 is arranged on the first line LH side. For example, the first switch S31 is an N-channel power MOSFET (Metal-Oxide-Semiconductor Field-Effect Transistor) with a reverse polarity diode (body diode). In this case, it is preferable that a source of the N-channel power MOSFET is connected to the first line LH and a drain of the N-channel power MOSFET is connected to the buffer capacitor.

The third diode D33 of the power pulsation absorbing circuit 130 is connected between a line connecting the buffer capacitor Cbuf to the first switch S31 of the power pulsation absorbing circuit 130 and the inductor Lb of the power pulsation absorbing circuit 130 so that the third diode D33 has a forward direction from the inductor Lb to this line.

The second switch S32 of the power pulsation absorbing circuit 130 is connected between the second line LL and a line connecting the inductor Lb to the third diode D33 of the power pulsation absorbing circuit 130. For example, the second switch S32 is an N-channel power MOSFET (Metal-Oxide-Semiconductor Field-Effect Transistor) with a reverse polarity diode (body diode). In this case, it is preferable that a drain of the N-channel power MOSFET is connected the line connecting the inductor Lb to the third diode D33 of the power pulsation absorbing circuit 130, and a source of the N-channel power MOSFET is connected to the second line LL.

The control section 140 controls switching the switches S21 to S28 of the DC/DC converter 120 as well as the switches S31 and S32 of the power pulsation absorbing circuit 130.

Since the power pulsation absorbing circuit 130 includes the first diode D31, the second diode D32, the third diode D33, the inductor Lb, the buffer capacitor Cbuf and the second switch S32, the power pulsation absorbing circuit 130 can function as a power correction circuit (PFC). According to the present embodiment, it is thus possible to control so as to input a sinusoidal voltage $v_s$/sinusoidal current is as shown below to the charger 100 from the AC power supply 200:

$$v_S(t) = \sqrt{2} V_S \sin \omega_S t$$

$$i_S(t) = \sqrt{2} I_S \sin \omega_S t$$

Figure 2:
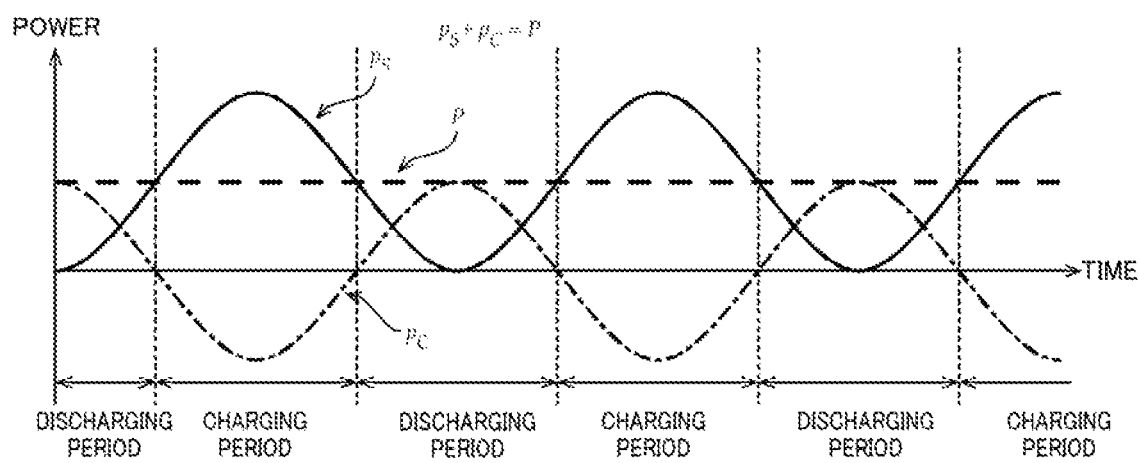
FIG. 2 shows a relation between an instantaneous power $p_S$ outputted from an AC power supply and an instantaneous power $p_C$ outputted from a buffer capacitor Cbuf.

In this case, the AC power supply 200 outputs an instantaneous power $p_S$ which is formed by a sum of an average power P ($=V_S I_S$) and a pulsation component $p_{rip}(t)$ ($=-V_S I_S \cos 2\omega_S t$) as shown below, wherein the instantaneous power $p_S$ pulsates around the average power P (indicated by a dash line in FIG. 2) with an angular frequency of a doubled AC angular frequency $\omega_s$ as indicated by a solid line in FIG. 2:

$$p_S(t) = v_S i_S = V_S I_S (1 - \cos 2\omega_S t) = P + p_{rip}(t)$$

wherein $V_s$ is an effective value of a power supply voltage, and $I_s$ is an effective value of a power supply current.

Therefore, the control section 140 controls the switching of the switches S21 to S28 of the DC/DC converter 120 and the switches S31 and S32 of the power pulsation absorbing circuit 130 to absorb a pulsation of a power of the AC power supply in the power pulsation absorbing circuit 130 so that a constant power is inputted to the DC/DC converter 120.

For such a control, the charger 100 according to the present embodiment is provided so that different controls are applied for different cases, i.e., an instantaneous power $p_S$ outputted from the AC power supply 200 being higher than the average power P ($p_S > P$), and an instantaneous power $p_S$ outputted from the AC power supply 200 being lower than the average power P ($p_S < P$).

When the AC power supply outputs an instantaneous power $p_S$ which is higher than the average power P ($p_S > P$), the eight switches S21 to S28 of the DC/DC converter 120 and the two switches S31 and S32 of the power pulsation absorbing circuit 130 are controlled in their switching to charge the buffer capacitor Cbuf with the pulsation component $p_{rip}$ of the instantaneous power $p_S$ via the inductor Lb of the power pulsation absorbing circuit 130, the instantaneous power $p_S$ having been outputted from the AC power supply 200, so that only the average power P of the power outputted from the AC power supply is inputted to the DC/DC converter 120. This means that according to the present embodiment, a period during which the instantaneous power $p_S$ outputted from the AC power supply is higher than the average power P is a period (charging period) during which the buffer capacitor Cbuf is charged, wherein the buffer capacitor Cbuf outputs a negative instantaneous power $p_C$ as indicated by a dot-dashed line in FIG. 2.

On the other hand, when the AC power supply outputs an instantaneous power $p_S$ which is lower than the average power P ($p_S < P$), the eight switches S21 to S28 of the DC/DC converter 120 and the first switch S31 of the power pulsation absorbing circuit 130 are controlled in their switching while keeping the second switch S32 of the power pulsation absorbing circuit 130 in an off-state to actively discharge the buffer capacitor Cbuf via the first switch S31 and compensate the pulsation component $p_{rip}$ as a difference between the instantaneous power $p_S$ outputted from the AC power supply 200 and the average power P, so that the average power P is inputted to the DC/DC converter 120. This means that according to the present embodiment, a period during which the instantaneous power $p_S$ outputted from the AC power supply is lower than the average power P is a period (discharging period) during which the buffer capacitor Cbuf is discharged, wherein the buffer capacitor Cbuf outputs a positive instantaneous power $p_C$ as indicated by a dot-dashed line in FIG. 2.

Thus, according to the present embodiment, the control section 140 controls the switching of the switches S21 to S28 of the DC/DC converter 120 and/or the switches S31 and S32 of the power pulsation absorbing circuit 130 in such a way that a sum of instantaneous power $p_S$ outputted from the AC power supply 200 and the instantaneous power $p_C$ outputted from the buffer capacitor Cbuf is constant.

In this manner, the present embodiment is provided so that the buffer capacitor Cbuf is discharged actively during the discharging period. According to the present embodiment, this enables an amount of power stored in the buffer capacitor Cbuf (i.e. a capacitance of the buffer capacitor Cbuf) to be limited so that it is possible to miniaturize the buffer capacitor Cbuf. Particularly, the buffer capacitor Cbuf according to the present embodiment may have a small capacitance and be miniaturized as compared to a capacitor of the PFC according to Non-Patent Document 1.

Further, the second switch S32 according to the present embodiment is operated only during the charging period. According to the present embodiment, this enables an amount of power stored in the inductor Lb (i.e. an inductance of the inductor Lb) to be limited so that it is possible to miniaturize the inductor Lb. Particularly, the inductor Lb according to the present embodiment may have a small inductance and be miniaturized as compared to an inductor of the PFC according to Non-Patent Document 1.

Furthermore, according to the present embodiment, the power inputted to the DC/DC converter 120 has no pulsation. According to the present embodiment, this enables the transformer Tr and/or DC capacitor Cdc of the DC/DC converter 120 to be miniaturized. Particularly, the transformer Tr and the DC capacitor Cdc according to the present embodiment may be miniaturized as compared to a transformer and a DC capacitor according to Non-Patent Documents 2 and 3.

As described above, the present embodiment enables passive elements to be miniaturized, such as a capacitor, an inductor and/or a transformer. Thus, the present embodiment can provide a small charger which enables pulsations of power to be absorbed.

<Switching Modes and Operation Waveforms>

FIGS. 3 to 9 show exemplar switching modes. FIG. 10 shows exemplary operation waveforms during the discharging period. The switching modes as shown in FIGS. 3 to 9 include seven modes (Mode 1, Mode 2, Mode 3, Mode 4, Mode 5, Mode 6, and Mode 7), wherein FIG. 10 shows operation waveforms which are obtained by switching to Mode 1, Mode 2, Mode 3, Mode 4, Mode 5, Mode 4, Mode 6, Mode 7, Mode 1, Mode 5 in this order. Since according to the present embodiment, the second switch S32 of the power pulsation absorbing circuit 130 is not operated during the discharging period, it is not necessary to take a power transfer via the inductor Lb into account. In addition, the diodes D31 and D32 of a charging circuit enable the charging circuit to be operated without affecting a discharging circuit and the DC/DC converter. In FIGS. 3 to 9, a circuit portion including the inductor Lb is thus omitted.

According to the present embodiment, the switches S21 to S28 of the DC/DC converter 120 and the first switch S31 of the power pulsation absorbing circuit 130 are controlled in switching in such a way that a current $i_L$ of the inductor L of the DC/DC converter 120 exhibits a waveform as shown in FIG. 10. According to the present embodiment, an input current $i_{in}$ of the DC/DC converter 120 is a sum of an output current $i_{rec}$ of the rectifier 110 and an output current $i_C$ of the buffer capacitor Cbuf ($i_n = i_{rec} + i_C$). The output current $i_{rec}$ of the rectifier 110 may not be negative. According to the present embodiment, when the first switch S31 of the power pulsation absorbing circuit 130 is on, it is controlled in such a way that a voltage $v_C$ applied to the buffer capacitor Cbuf is always larger than an instantaneous voltage $v_{rec}$ outputted from the rectifier 110, so that the buffer capacitor Cbuf is more actively discharged. According to the present embodiment, $i_{rec} = 0$ and $i_{in} = i_C$ for $i_{in} < 0$.

Figure 3A:
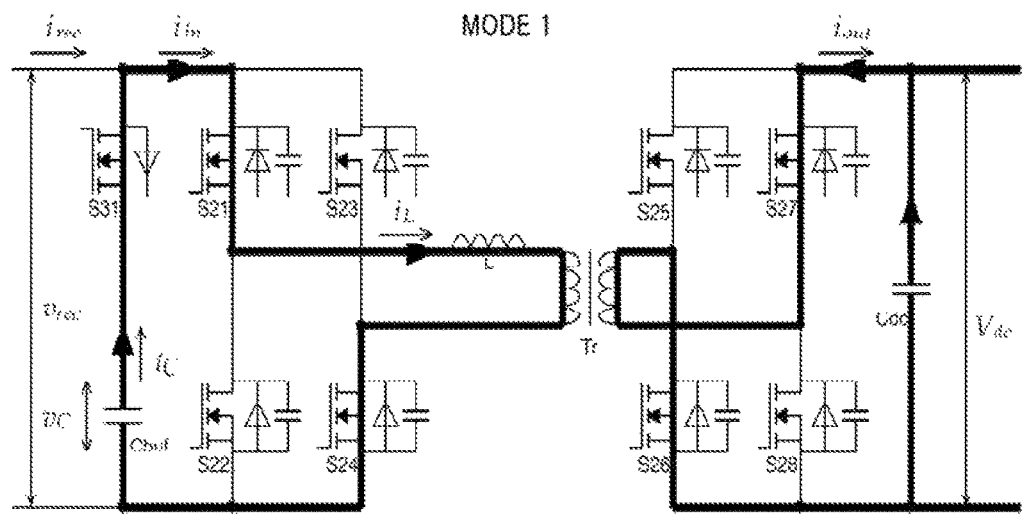
FIGS. 3(A)-3(B) show a flow of current in Mode 1.
Figure 3B:
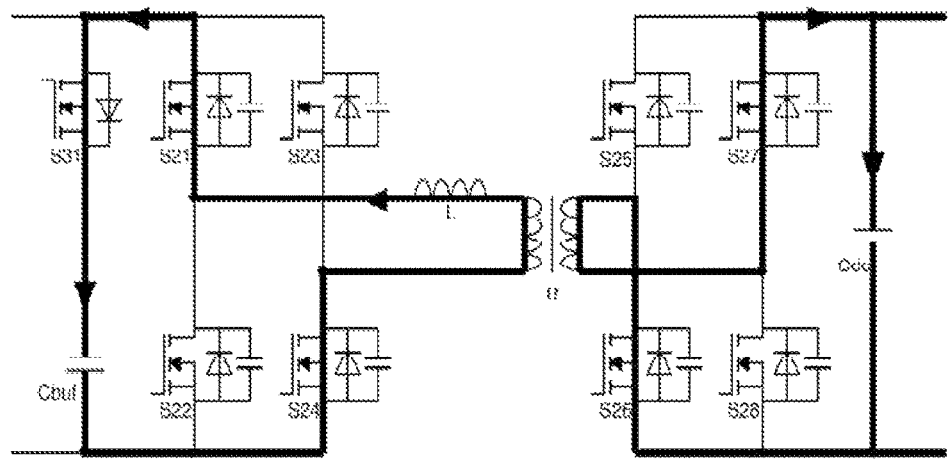

In Mode 1, the switches S21, S24, S26, S27 and S31 are on while the switches S22, S23, S25 and S28 are off. When $i_L > 0$, a current flows as shown in FIG. 3(A), while when $i_L < 0$, a current flows as shown in FIG. 3(B). Assuming that it is switched to Mode 1 at the time $t_{c1}$, the current $i_L$ in Mode 1 is changed over time according to the following formula:

$$i_L(t) = \frac{v_C + V_{dc}}{L}(t - t_{c1}) + i_L(t_{c1})$$

wherein L is an inductance of the inductor L. For simplification, a turn ratio of the transformer Tr is 1:1. When $i_L > 0$ (FIG. 3(A)), both of the buffer capacitor Cbuf and the DC capacitor Cdc are discharged, and power is stored in the inductor L. On the other hand, when $i_L < 0$ (FIG. 3(B)), both of the buffer capacitor Cbuf and the DC capacitor Cdc are charged with the power stored in the inductor L. This means that in Mode 1, power is circulated within the charger 100 and no power is transferred to the battery 300 from the charger 100. When $i_L < 0$, a current flows as shown in FIG. 3(B), based on the polarity of the diodes of the rectifier 110 and the polarity of the diode of the switch S31, even if the switch S31 is off. For example, although Mode 1 is established during a period from $t_0$ to $t_1$ in FIG. 10, the following formula is obtained from the above-mentioned formula due to $i_L(t_0) = 0$:

$$i_L(t) = \frac{v_C + V_{dc}}{L}(t - t_0) \quad t_0 < t \leq t_1$$

Figure 4:
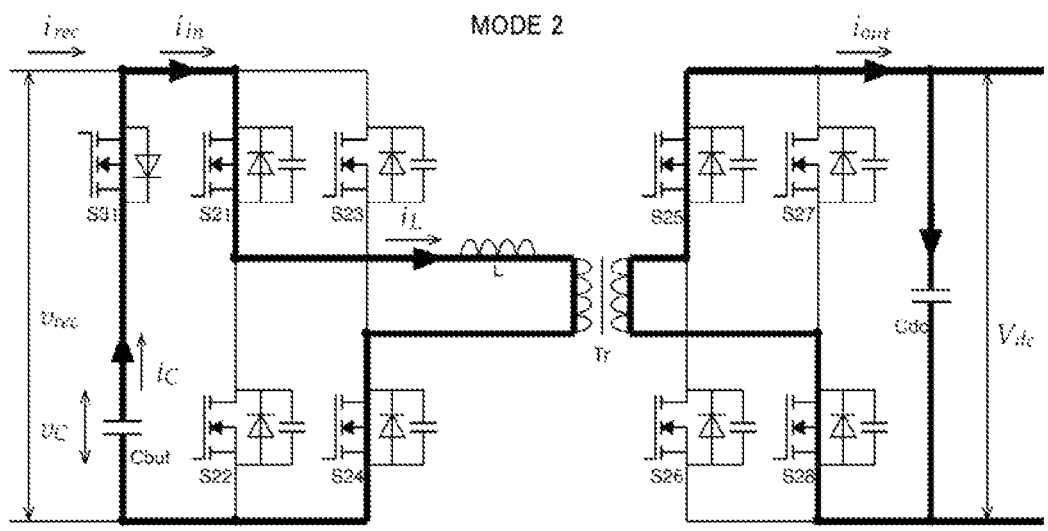
FIG. 4 shows a flow of current in Mode 2.

In Mode 2, the switches S21, S24, S25, S28, S31 are on, and the switches S22, S23, S26 and S27 are off, wherein a current flows as shown in FIG. 4. By switching from Mode 1 to Mode 2, a voltage polarity on the secondary side of the DC/DC converter 120 is inverted. Therefore, assuming that it is switched to Mode 2 at the time $t_{c2}$, the current $i_L$ in Mode 2 is changed over time according to the following formula:

$$i_L(t) = \frac{v_C - V_{dc}}{L}(t - t_{c2}) + i_L(t_{c2})$$

When $i_L > 0$, the DC capacitor Cdc and the battery 300 connected between the third terminal 123 and the fourth terminal 124 are charged with the power discharged from the buffer capacitor Cbuf. This means that in Mode 2, power is transferred to the battery 300 from the charger 100.

Figure 5:
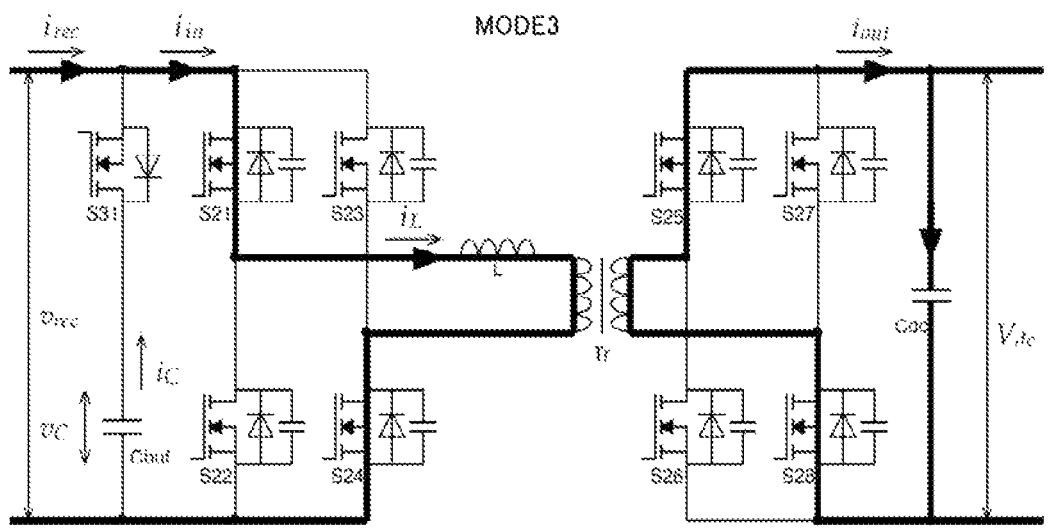
FIG. 5 shows a flow of current in Mode 3.

In Mode 3, the switches S21, S24, S25 and S28 are on, and the switches S22, S23, S26, S27 and S31 are off, wherein a current flows as shown in FIG. 5. By switching from Mode 2 to Mode 3, the first switch S31 of the power pulsation absorbing circuit 130 is switched to off. Therefore, assuming that it is switched to Mode 3 at the time $t_{c3}$, the current $i_L$ in Mode 3 is changed over time according to the following formula:

$$i_L(t) = \frac{v_{rec} - V_{dc}}{L}(t - t_{C3}) + i_L(t_{C3})$$

When $i_L > 0$, the DC capacitor Cdc and the battery 300 connected between the third terminal 123 and the fourth terminal 124 are charged with power supplied from the AC power supply 200. This means that in Mode 3, power is transferred to the battery 300 from the charger 100.

Figure 6A:
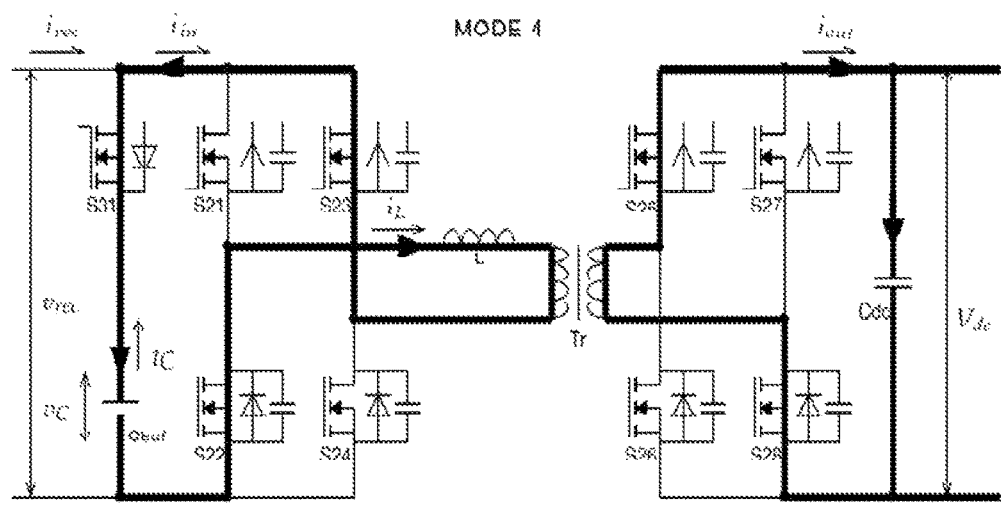
FIGS. 6(A)-6(B) show a flow of current in Mode 4.
Figure 6B:
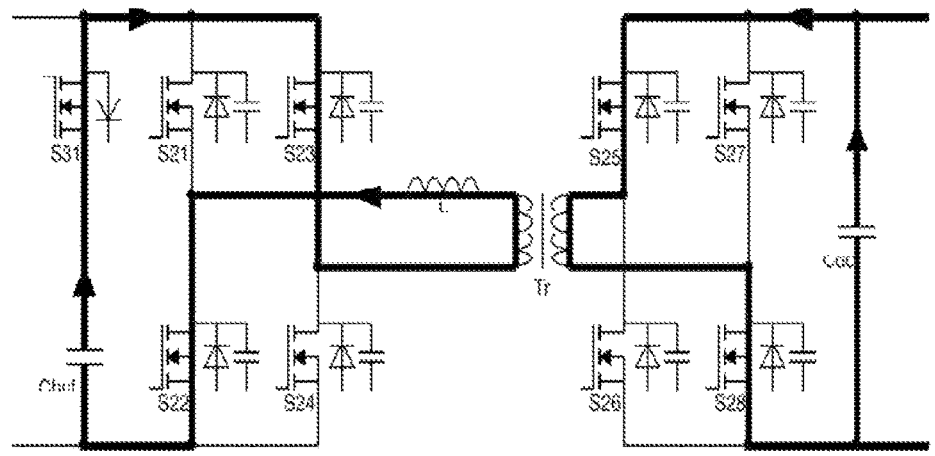

In Mode 4, the switches S22, S23, S25, S28 and S31 are on, and the switches S21, S24, S26 and S27 are off, wherein when $i_L > 0$, a current flows as shown in FIG. 6(A), while when $i_L < 0$, a current flows as shown in FIG. 6(B). By switching from Mode 3 to Mode 4, the voltage polarity of the secondary side is inverted, and the first switch S31 of the power pulsation absorbing circuit 130 is switched to on. Therefore, assuming that it is switched to Mode 4 at the time $t_{c4}$, the current $i_L$ in Mode 4 is changed over time as follows:

$$i_L(t) = -\frac{v_C + V_{dc}}{L}(t - t_{c4}) + i_L(t_{c4})$$

When $i_L > 0$, both of the buffer capacitor Cbuf and the DC capacitor Cdc are charged with power stored in the inductor L (FIG. 6(A)), while when $i_L < 0$, both of the buffer capacitor Cbuf and the DC capacitor Cdc are discharged so that power is stored in the inductor L (FIG. 6(B)). This means that in Mode 4, power is circulated within the charger 100 and no power is transferred to the battery 300 from the charger 100. When $i_L > 0$, a current flows as shown in FIG. 6(A), based on the polarity of the diodes of the rectifier 110 and the polarity of the diode of the switch S31, even if the switch S31 is off.

Figure 7:
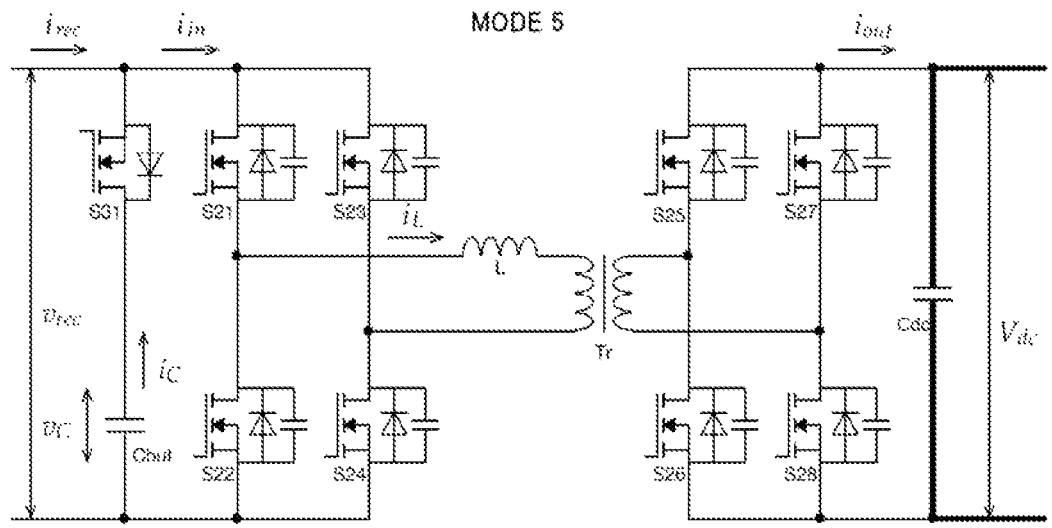
FIG. 7 shows a flow of current in Mode 5.

In Mode 5, all the switches S21 to S28 and S31 are off, wherein a current flows as shown in FIG. 7. Therefore, assuming that zero current flows ($i_L(t_{c5}) = 0$) when it is switched to Mode 5 at the time $t_{c5}$ like the example shown in FIG. 10, the current $i_L$ in Mode 5 exhibits such a temporal behavior that no current flows through the transformer Tr and $i_L(t) = 0$.

Figure 8:
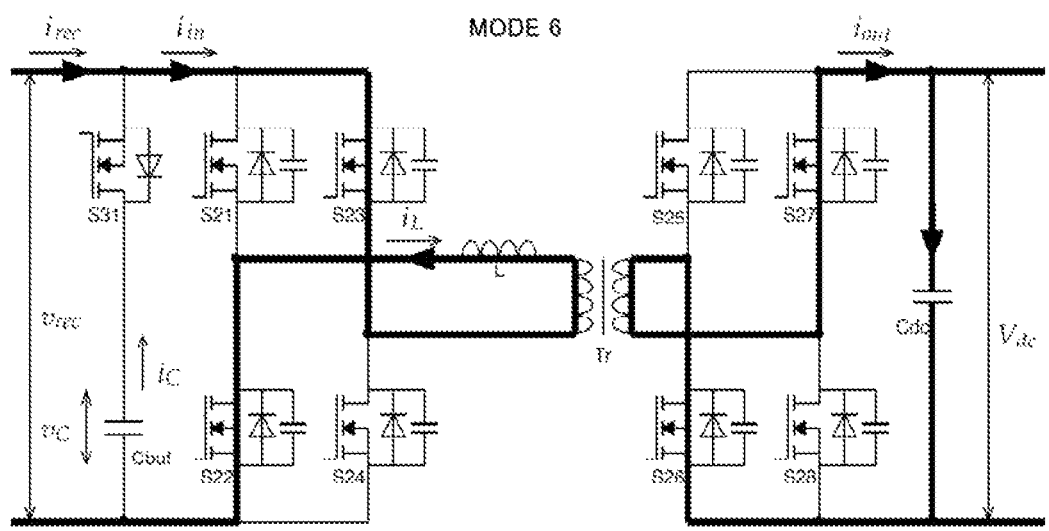
FIG. 8 shows a flow of current in Mode 6.

In Mode 6, the switches S22, S23, S26 and S27 are on, and the switches S21, S24, S25, S28 and S31 are off, wherein a current flows as shown in FIG. 8. Assuming that it is switched to Mode 6 at the time $t_{c6}$, the current $i_L$ in Mode 6 is changed over time according to the following formula:

$$i_L(t) = -\frac{v_{rec} - V_{dc}}{L}(t - t_{C6}) + i_L(t_{C6})$$

Here, when $i_L < 0$, the DC capacitor Cdc and/or the battery 300 connected between the third terminal 123 and the fourth terminal 124 is charged with power supplied from the AC power supply 200. This means that in Mode 6, power is transferred to the battery 300 from the charger 100.

Figure 9:
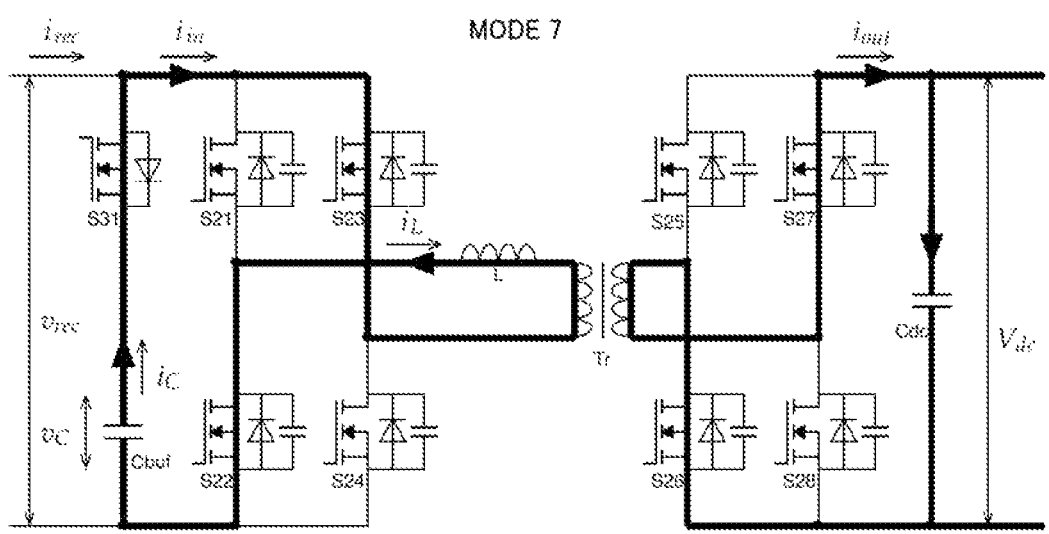
FIG. 9 shows a flow of current in Mode 7.
Figure 10:
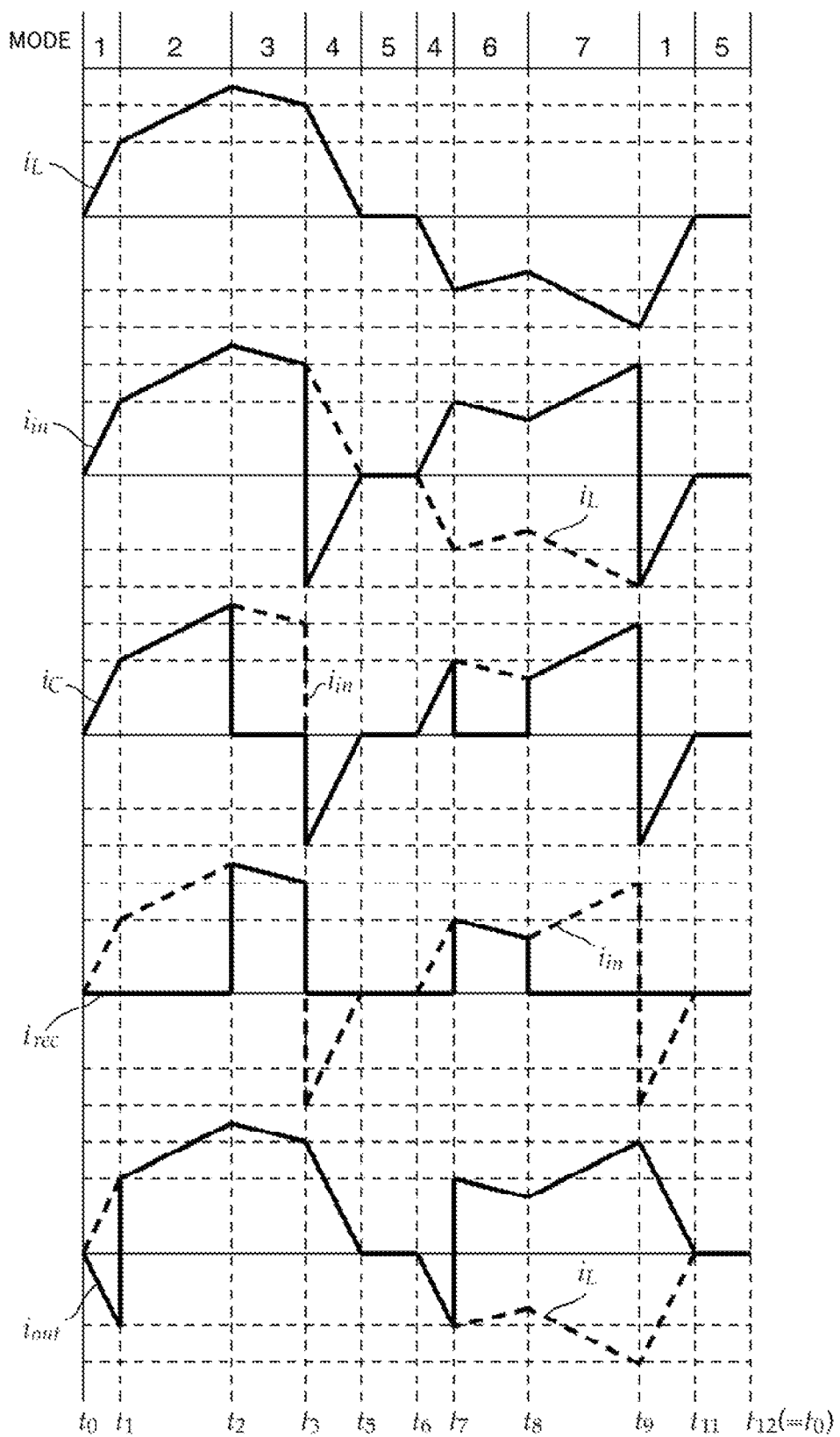
FIG. 10 shows an example for operation waveforms during a discharging period.

In Mode 7, the switches S22, S23, S26, S27 and S31 are on, and the switches S21, S24, S25 and S28 are off, wherein a current flows as shown in FIG. 9. By switching from Mode 6 to Mode 7, the first switch S31 of the power pulsation absorbing circuit 130 is switched to on. Therefore, assuming that it is switched to Mode 7 at the time $t_{c7}$, the current $i_L$ in Mode 7 is changed over time according to the following formula:

$$i_L(t) = -\frac{v_C - V_{dc}}{L}(t - t_{c7}) + i_L(t_{c7})$$

When $i_L<0$, the DC capacitor Cdc and/or the battery 300 connected between the third terminal 123 and the fourth terminal 124 is charged with power discharged from the buffer capacitor Cbuf. This means that in Mode 7, power is transferred to the battery 300 from the charger 100.

A length for each of the periods for the operation waveforms according to FIG. 10, i.e. a switching control rule for obtaining the waveforms according to FIG. 10 is given by solving the current formulas for the respective periods as simultaneous equations in such a way that the instantaneous voltage $v_C$ applied to the buffer capacitor Cbuf is always larger than the instantaneous voltage $v_{rec}$ outputted from the rectifier 110 and the sum of the instantaneous power $p_S$ outputted from the AC power supply 200 and the instantaneous power $p_C$ outputted from the buffer capacitor Cbuf is constant.

As described above, in Modes 1 and 4, no power is transferred to the battery 300 from the charger 100 although a current flows through the transformer Tr. This means that in the operation waveforms as shown in FIG. 10, the periods between $t_0$ and $t_1$, between $t_3$ and $t_5$, between $t_6$ and $t_7$ and between $t_9$ and $t_{11}$ are reactive current periods in which no power is transferred to the battery 300 from the AC power supply 200. However, due to the control for obtaining $v_C > v_{rec}$ according to the present embodiment, a gradient of the waveforms during the reactive current periods is determined by the voltage $v_C$ applied to the buffer capacitor Cbuf. Therefore, the present embodiment enables the reactive current periods to be reduced, as compared to conventional chargers with a waveform gradient during the reactive current period which is determined depending on $v_{rec}$ of the rectifier 110. Therefore, the present embodiment enables power transfers with a better efficiency than conventional chargers.

Further, according to the present embodiment, the voltage $v_C$ applied to the buffer capacitor Cbuf has a value which is different from the instantaneous voltage $v_{rec}$ of the rectifier 110. Therefore, according to the present embodiment, the waveforms of Modes 2 and 3 have different gradients. Similarly, the waveforms of Modes 6 and 7 have different gradients. According to the present embodiment, this enables operation waveforms to be generated in which positive and negative waveforms are asymmetric with regard to $i_L=0$, as shown in FIG. 10. According to the present embodiment, this enables a perspective of an method of approximating operation waveforms with equivalent rectangular waveforms, as described in more details below (Yoshiya Onuma and Satoshi Miyawaki: "Control method for a High-Frequency Insulated AC-DC Converter Which Consists of a Matrix Converter and PWM Rectifier", Convention record I.E.E. Japan, Industry Applications Society, Vol. 1, No. 53, pp. 197-200 (2018)), so that it is possible to more easily obtain a control rule for switching. The perspective of this method is to change the order of voltages applied to the leakage inductor for positive and negative periods of the leakage inductor current so that the positive and negative waveforms are asymmetric. However, this method has been proposed for a matrix converter, wherein any voltage applied to the leakage inductor is selectable from a three-phase AC voltage. On the other hand, the voltage applied to the leakage inductor according to the present embodiment is uniquely determined by the polarity of the current through the leakage inductor, as shown in FIGS. 3(B) and 6(A). Therefore, it is necessary to apply a method which takes this point into account.

<Approximation of Operation Waveforms with Equivalent Rectangular Waveforms>

In order to obtain the control rule for the waveforms according to FIG. 10, it is necessary to solve the current formulas for ten periods as simultaneous equations. However, the asymmetric operation waveforms as shown in FIG. 10 can be approximated with an equivalent rectangular waveform, whereby it is possible to more easily obtain the control rule for switching.

For the operation waveforms as shown in FIG. 10, Mode 1 is applied in a period between $t_0$ and $t_1$, Mode 2 is applied in a period between $t_1$ and $t_2$, Mode 3 is applied in a period between $t_2$ and $t_3$, Mode 4 is applied in a period between $t_3$ and $t_5$, Mode 5 is applied in a period between $t_5$ and $t_6$, Mode 4 is applied in a period between $t_6$ and $t_7$, Mode 6 is applied in a period between $t_7$ and $t_8$, Mode 7 is applied in a period between $t_8$ and $t_9$, Mode 1 is applied in a period between $t_0$ and $t_{11}$, and Mode 5 is applied in a period between $t_{11}$ and $t_{12}$. For example in the waveforms according to FIG. 10, by providing $t_0$-$t_3$, $t_5$-$t_9$, $t_{11}$ and $t_{12}$ so that $|t_0-t_1|=|t_6-t_7|$, $|t_1-t_2|=|t_8-t_9|$, $|t_2-t_3|=|t_7-t_8|$ and $|t_3-t_5|=|t_9-t_{11}|$, and by providing $t_4$ between $t_3$ and $t_5$ as well as $t_{10}$ between $t_9$ and $t_{11}$ so that $|t_0-t_1|=|t_4-t_5|=|t_{10}-t_{11}|$, the operation waveforms according to FIG. 10 can be approximated with an equivalent rectangular waveform $i_L'$ as shown in FIG. 11.

$$\begin{cases} i_L'(t) = \dfrac{i_L(t_1) + i_L(t_3)}{2} = I_{sq} & (t_1 \le t \le t_4) \\ i_L'(t) = -I_{sq} & (t_7 \le t \le t_{10}) \\ i_L'(t) = 0 & (t_0 \le t < t_1, t_4 < t < t_7, t_{10} < t < t_{12}) \end{cases}$$

Figure 11:
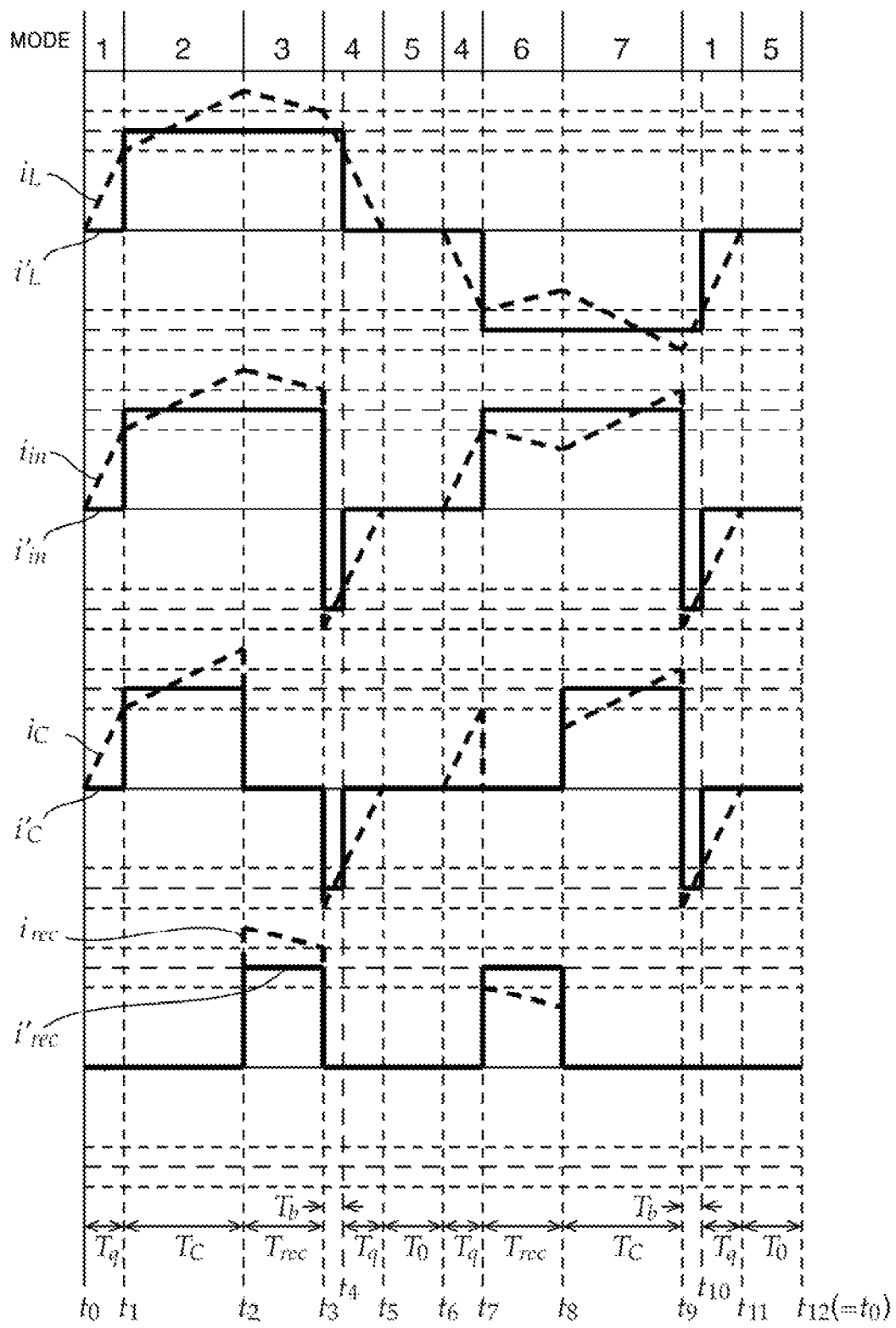
FIG. 11 shows an example for rectangular waves which are equivalent to the operation waveforms according to FIG. 10.

If in the equivalent rectangular waveform $i_L'$ according to FIG. 11, the periods between $t_0$ and $t_1$, between $t_4$ and $t_5$, between $t_6$ and $t_7$, and between $t_{10}$ and $t_{11}$ are defined as reactive current periods $T_q$, the periods between $t_1$ and $t_2$ and between $t_8$ and $t_9$ are defined as buffer capacitor discharging current periods $T_C$, the periods between $t_2$ and $t_3$ and between $t_7$ and $t_8$ are defined as power supply current periods $T_{rec}$, the periods between $t_3$ and $t_4$ and between $t_9$ and $t_{10}$ are defined as current balance periods $T_b$, and the periods between $t_5$ and $t_6$ and between $t_{11}$ and $t_{12}$ are defined as zero current periods $T_0$, this results in duty cycles for the respective periods during a switching cycle $T_{SW}$ as follows:

$$\begin{cases} D_q = \dfrac{2T_q}{T_{SW}} = \dfrac{2I_{sq}L}{(v_C + V_{dc})T_{SW}} - \dfrac{(v_{rec} - V_{dc})i_{rec} + (v_C - V_{dc})i_C}{4V_{dc}I_{sq}} \\ D_C = \dfrac{2T_C}{T_{SW}} = \dfrac{(v_{rec} - V_{dc})i_{rec} + (v_C + V_{dc})i_C}{2V_{dc}I_{sq}} \\ D_{rec} = \dfrac{2T_{rec}}{T_{SW}} = \dfrac{i_{rec}}{I_{sq}} \\ D_b = \dfrac{2T_b}{T_{SW}} = \dfrac{(v_{rec} - V_{dc})i_{rec} + (v_C - V_{dc})i_C}{2V_{dc}I_{sq}} \\ D_0 = \dfrac{2T_0}{T_{SW}} = 1 - \dfrac{4I_{sq}L}{(v_C + V_{dc})T_{SW}} - \dfrac{(v_{rec} + V_{dc})i_{rec} + (v_C + V_{dc})i_C}{2V_{dc}I_{sq}} \end{cases}$$

By giving $i_{rec}$, $i_C$, $v_C$, $V_{dc}$ and $I_{sq}$ as command values, it is possible to obtain the duty cycles for the respective periods. The control rule for the operation waveforms according to FIG. 10 can be obtained by using the obtained duty cycles for the periods.

By switching $i_{rec}$ and $i_C$ of the above-mentioned command values between the discharging period and the charging period, the power pulsation absorbing circuit can fulfill its function.

In the discharging period, the charging circuit of the power pulsation absorbing circuit 130 (a circuit portion including the first diode D31, the second diode D32, the inductor Lb and the second switch S32) is not operated, so that this charging circuit draws zero power from the AC power supply 200. As a result, the power outputted from the AC power supply 200 coincides with the output power from the rectifier 110. At this time, by giving a command value $i_{rec}^*$ for $i_{rec}$ as follows, the power supply current has a sinusoidal waveform.

$$i_{rec}^* = \sqrt{2}\dfrac{P}{V_S}|\sin\omega_S t|$$

Thus, the present embodiment provides a function which is similar to a PFC. At this time, the instantaneous power $p_S$ outputted from the AC power supply 200 is smaller than the average power P, and therefore, the buffer capacitor Cbuf is discharged by giving a command value $i_c^*$ for $i_C$ as follows so as to compensate a difference between the instantaneous power $p_S$ and the average power P:

$$i_C^* = \dfrac{P}{v_C}\cos 2\omega_S t$$

In the charging period, the instantaneous power $p_S$ outputted from the rectifier 110 is caused to coincide with the average power P by giving a command value $i_{rec}^*$ for $i_{rec}$ as follows:

$$i_{rec}^* = \dfrac{P}{\sqrt{2}\,V_S|\sin\omega_S t|}$$

Since the instantaneous power $p_S$ outputted from the AC power supply 200 is larger than the average power P, the excessive power is stored in the buffer capacitor Cbuf via the charging circuit, whereby the buffer capacitor Cbuf can be charged and the power supply current can have a sinusoidal waveform (PFC-operation). At this time, the rectifier 110 transmits a constant power to the DC/DC converter, so that it is not necessary to discharge the buffer capacitor Cbuf, wherein the command value $i_c^*$ for $i_C$ is given as follows:

$$i_C^* = 0$$

The present invention has been described by means of preferable embodiments thereof above. Although the present invention has been described here by demonstrating specific examples, these may be modified and altered in various ways without departing from the core and scope of the present invention defined in the claims.

REFERENCE SIGNS LIST

100 Charger
110 Rectifier
120 DC/DC converter
S21 to S28 Switches of the DC/DC converter
130 Power pulsation absorbing circuit
D31 First diode
D32 Second diode
D33 Third diode
Lb Inductor
Cbuf Buffer capacitor
S31 First switch
S32 Second switch

What is claimed is:

1. A charger comprising:
   a rectifier including two input terminals, a cathode terminal and an anode terminal, wherein the two input terminals are provided for connection to an AC power supply;
   a DC/DC converter including:
      a first terminal configured to be connected to the cathode terminal of the rectifier via a first line;
      a second terminal configured to be connected to the anode terminal of the rectifier via a second line; and
      two output terminals for connection to a battery;
   a power pulsation absorbing circuit including a first diode, a second diode, a third diode, an inductor, a capacitor, a first switch and a second switch; and
   a control section configured to control a switch of the DC/DC converter, the first switch and the second switch,
   wherein the first diode is connected between the inductor and one of the two input terminals of the rectifier, and the second diode is connected between the inductor and another of the two input terminals of the rectifier,
   wherein the capacitor and the first switch are connected in series between the first line and the second line, and the capacitor is arranged on a side of the second line,
   wherein the third diode is connected between the inductor and a line connecting the capacitor to the first switch,
   wherein the second switch is connected between the second line and a line connecting the inductor to the third diode; and
   wherein the control section is configured to control the DC/DC converter, the first switch and the second switch in such a way that a sum of a power outputted from the AC power supply and a power outputted from the capacitor is constant.

2. The charger according to claim 1,
   wherein the control section is configured to control the DC/DC converter, the first switch and the second switch in such a way that a voltage applied to the capacitor is larger than an output voltage of the rectifier.

3. The charger according to claim 1,
wherein the control section is configured to:
- control the DC/DC converter, the first switch and the second switch so as to charge the capacitor with a portion of the power outputted from the AC power supply during a charging period, wherein during the charging period, an instantaneous power outputted from the AC power supply is higher than an average power of the power outputted from the AC power supply; and
- control the DC/DC converter, the first switch and the second switch so as to discharge the power in the capacitor during a discharging period, wherein during the discharging period, the instantaneous power outputted from the AC power supply is lower than the average power of the power outputted from the AC power supply.

4. The charger according to claim 2,
wherein the control section is configured to:
- control the DC/DC converter, the first switch and the second switch so as to charge the capacitor with a portion of the power outputted from the AC power supply during a charging period, wherein during the charging period, an instantaneous power outputted from the AC power supply is higher than an average power of the power outputted from the AC power supply; and
- control the DC/DC converter, the first switch and the second switch so as to discharge the power in the capacitor during a discharging period, wherein during the discharging period, the instantaneous power outputted from the AC power supply is lower than the average power of the power outputted from the AC power supply.

5. The charger according to claim 3,
wherein the control section is configured to keep the second switch in an off-state during the discharging period.

6. The charger according to claim 4,
wherein the control section is configured to keep the second switch in an off-state during the discharging period.

7. The charger according to claim 5,
wherein the control section is configured to control the DC/DC converter and the first switch in such a way that a high-frequency current of a leakage inductor of a transformer of the DC/DC converter has an asymmetric waveform.

8. The charger according to claim 6,
wherein the control section is configured to control the DC/DC converter and the first switch in such a way that a high-frequency current of a leakage inductor of a transformer of the DC/DC converter has an asymmetric waveform.

9. The charger according to claim 1,
wherein the DC/DC converter is a DAB converter.

* * * * *